(12) United States Patent
Gong et al.

(10) Patent No.: US 9,243,854 B2
(45) Date of Patent: Jan. 26, 2016

(54) HEAT DISSIPATION BRACKET FOR BATTERY PACK ASSEMBLY

(75) Inventors: Shugang Gong, Shenzhen (CN);
Xingyin Wu, Shenzhen (CN); Zhiling Guo, Shenzhen (CN); Zhilong Ouyang, Shenzhen (CN); Peng He, Shenzhen (CN); Lei Peng, Shenzhen (CN); Fanguo Kong, Shenzhen (CN)

(73) Assignee: Shenzhen Zhiyou Battery Integration Technology Co., Ltd., Shenzhen (CN)

( * ) Notice: Subject to any disclaimer, the term of this patent is extended or adjusted under 35 U.S.C. 154(b) by 398 days.

(21) Appl. No.: 13/821,820

(22) PCT Filed: Sep. 7, 2011

(86) PCT No.: PCT/CN2011/079448
§ 371 (c)(1),
(2), (4) Date: Apr. 3, 2013

(87) PCT Pub. No.: WO2012/031554
PCT Pub. Date: Mar. 15, 2012

(65) Prior Publication Data
US 2013/0180684 A1 Jul. 18, 2013

(30) Foreign Application Priority Data

Sep. 8, 2010 (CN) .......................... 2010 1 0277709

(51) Int. Cl.
*F28F 9/007* (2006.01)
*H01M 10/6551* (2014.01)
(Continued)

(52) U.S. Cl.
CPC ............. *F28F 9/007* (2013.01); *H01M 10/613* (2015.04); *H01M 10/643* (2015.04); *H01M 10/6551* (2015.04); *H01M 10/6557* (2015.04); *H01M 2/105* (2013.01); *H01M 2/1077* (2013.01)

(58) Field of Classification Search
CPC . F28F 9/007; H01M 10/613; H01M 10/6557; H01M 10/643; H01M 10/6551; H01M 2/105; H01M 2/1077
See application file for complete search history.

(56) References Cited

U.S. PATENT DOCUMENTS

| 5,300,125 | A | 4/1994 | Desai et al. |
| 8,293,392 | B2 * | 10/2012 | Park et al. ........................ 429/99 |

(Continued)

FOREIGN PATENT DOCUMENTS

| CN | 101385160 | 3/2009 |
| CN | 101820053 | 9/2010 |

(Continued)

*Primary Examiner* — Stewart Fraser
(74) *Attorney, Agent, or Firm* — Hamre, Schumann, Mueller & Larson, P.C.

(57) ABSTRACT

A heat dissipation bracket for a battery pack assembly, comprises: a plurality of battery support brackets with an open end in a lower portion thereof; and a baffle mated with the open end, wherein the open end and the upper end of the battery support bracket and the two sides of the baffle are provided with corresponding horizontal protruding edges; the open end of one of the plurality of battery support brackets is provided with the baffle, while the rest of the battery support brackets are vertically stacked and disposed on the upper end of the battery support brackets; the battery support bracket, the baffle, and the stacked battery support brackets are connected through bolts in the corresponding horizontal protruding edges; a plurality of battery positioning slots are formed by the battery support brackets and the inner wall of the baffle; a plurality of raised bars are formed on the outer wall of the baffle along the longitudinal axial direction of the battery positioning slots, and a heat exchange channel is formed between the raised bars on the outer wall and the battery positioning slots on the inner wall.

14 Claims, 2 Drawing Sheets

(51) Int. Cl.
*H01M 10/6557* (2014.01)
*H01M 10/643* (2014.01)
*H01M 10/613* (2014.01)
*H01M 2/10* (2006.01)

(56) References Cited

U.S. PATENT DOCUMENTS

| | | | |
|---|---|---|---|
| 8,974,951 B2 * | 3/2015 | Park et al. | 429/159 |
| 9,005,798 B2 * | 4/2015 | Park | 429/154 |
| 2007/0190405 A1 * | 8/2007 | Kang et al. | 429/99 |
| 2007/0264562 A1 * | 11/2007 | Kang et al. | 429/96 |
| 2009/0191452 A1 * | 7/2009 | Anantharaman et al. | 429/120 |

FOREIGN PATENT DOCUMENTS

| | | |
|---|---|---|
| CN | 102013463 | 4/2011 |
| CN | 201789015 | 4/2011 |
| JP | 2009-99452 | 5/2009 |

\* cited by examiner

HEAT DISSIPATION BRACKET FOR BATTERY PACK ASSEMBLY

TECHNICAL FIELD

The present invention relates to a bracket for battery pack assembly, and more particularly, to a heat dissipation bracket for battery pack assembly.

BACKGROUND

The battery is an indispensable article in people's life and work and is recognized by the human being. Because the volume of the battery cell is limited by the technologies and can't increase unboundedly, the high power battery is formed by assembling a plurality of low power battery cells. The present different kinds of the battery necessarily generate heat when they work. The heating problem is more obvious in the widely used lithium ion battery or the similar battery group or battery assembly consisting of the battery cells. When the lithium ion battery and the similar battery is used, the safe hidden danger and the unstable control is generated due to increase of the environment temperature, it is recognized by the person in the battery field and affects the industrial process of the high power battery seriously. Therefore, how to solve the heat dissipation problem has become a big technique difficulty needed to be breached during the development of the industry.

Saying from the battery technology, enhancing the management of the battery charging or discharging and decreasing the heat generated from battery charging and discharging and the heat generated speed from the electrochemistry is a method for solving the problem. Besides distributing the heat that the battery generates when it works to an environment that is not sensitive to the temperature is also a method that may be actively used. But the present brackets of the battery pack assembly usually have a bad heat dissipation structure and property and so can't achieve the purpose of dissipating the heat quickly.

SUMMARY

To solve the problem mentioned above, the present invention provides a heat dissipation bracket for a battery pack assembly. The heat dissipation bracket for a battery pack assembly, comprising: a plurality of battery support brackets with an open end in a lower portion thereof; and a baffle mated with the open end, wherein the open end and the upper end of the battery support bracket and the two sides of the baffle are provided with corresponding horizontal protruding edges; the open end of one of the plurality of battery support brackets is provided with the baffle, while the rest of the battery support brackets are vertically stacked and disposed on the upper end of the battery support brackets; the battery support bracket, the baffle, and the stacked battery support brackets are connected through bolts in the corresponding horizontal protruding edges; a plurality of battery positioning slots are formed by the battery support brackets and the inner wall of the baffle; a plurality of raised bars are formed on the outer wall of the baffle along the longitudinal axial direction of the battery positioning slots, and a heat exchange channel is formed between the raised bars on the outer wall and the battery positioning slots on the inner wall.

Further, at least two battery positioning slots are spacedly formed in the battery support brackets and the inner wall of the baffle, the battery support bracket and the raised bar on the outer wall of the battle are disposed between two battery positioning slots.

Further, two sides of the upper end on the outer wall of the battery support bracket and the baffle are provided with a support rib having the same height with the raised bar and dovetailed inner grooves are formed between the support rib and the raised bar and between the raised bars.

Further, the heat exchange channel is provided with a thread connected with a guide pipe and a through groove is disposed around the thread.

Further, wherein the horizontal protruding edges on the open end and the upper end of the battery support bracket are provide with a corresponding first rib or first groove and the horizontal protruding edges on the baffle are provided with a second groove or second rib corresponding to the horizontal protruding edges on the open end of the battery support bracket.

Further, two sides of the first rib or first groove, second rib or second groove on the horizontal protruding edges are provided with a corresponding groove shaped or rib shaped rigid sealing line.

Further, the horizontal protruding edges on the upper end of the battery support bracket are disposed on a horizontal protruding bulge on the side wall.

Further, the horizontal protruding bulge is provided with a through hole.

Further, a clapboard is disposed between the battery positioning slots of the battery support bracket.

Further, the battery support bracket and the raised bars on the outer wall of the baffle are provided with a protruding rib for dissipating heat and anti-skid.

In the present invention, the a plurality of battery positioning slots are set in the battery support bracket and the battery support brackets may be stacked and fixed through bolts in the corresponding horizontal protruding edges. The open end of the bottom battery support bracket is closed with a baffle. Therefore heat dissipation bracket for a battery pack assembly may be optionally assemble battery cells according to the need and battery pack assembly with different power may be formed. The heat exchange channel is formed in the battery support bracket and the baffle, and the heat conduction media may pass through the heat exchange channel, so the work temperature of the battery pack may be increased or decreased according to the need through the heat conduction media. The present invention provides a new idea to solve the heat dissipation problem when more than one battery cells are assembled the assembled battery cells will generate heat during the work period. And the present invention also solves the problem that the battery group or battery pack assembly is hard to be fixed and maintained. The industrial level of the battery pack may be improved.

DETAILED DESCRIPTION OF THE PREFERRED EMBODIMENTS

Figure 1:
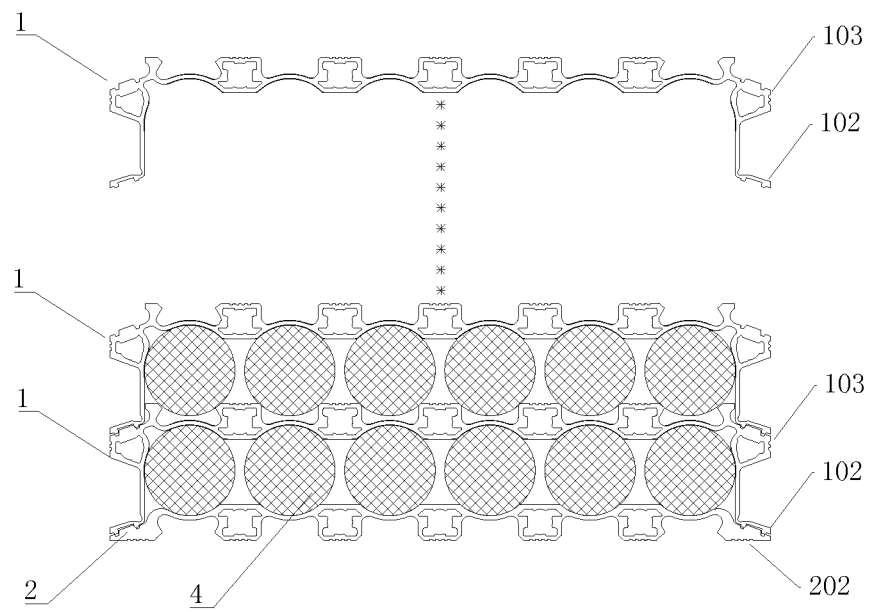
FIG. 1 is the whole schematic diagram according to one embodiment of the present invention.
Figure 2:
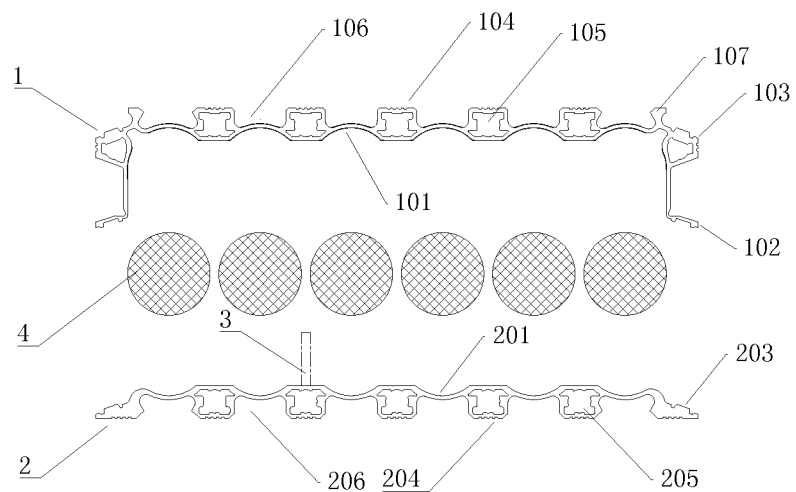
FIG. 2 is a structure schematic diagram of the battery support bracket and the baffle according to one embodiment of the present invention.

Referring to FIGS. 1 and 2, a heat dissipation bracket for a battery pack assembly includes a plurality of arbitrarily matched battery support brackets 1 and a baffle 2.

The battery support bracket is provided with an open end in a lower portion thereof to mate with the baffle. Horizontal protruding edges 102 are disposed on the two sides of the open end of the battery support bracket, a corresponding horizontal protruding bulge 103 is disposed on the side wall of the upper end of the battery support bracket 1. Horizontal protruding edges corresponding to the horizontal protruding edges 102 on the open end of the battery support bracket are formed on the upper surface of the horizontal protruding bulge 103, so the plurality battery support bracket 1 may be stacked vertically. The horizontal protruding edges 102 on the open end of the battery support bracket contact the upper surface of the horizontal protruding bulge 103 on the upper end of the adjacent battery support bracket, and the horizontal protruding edge 102 and the horizontal protruding bulge 103 is fixed with the bolt to form a battery pack assembly.

A plurality of battery positioning slots 101 for accommodating the battery cell 4 therein are spacedly formed in an inner wall of the battery support bracket 1 (a clapboard 3 may be set between the battery positioning slots 101 for spacing according to the need). A plurality of raised bars 104 are formed between two adjacent battery positioning slots and on an outer wall of the battery support bracket along the longitudinal axial direction of the battery positioning slots 101. A thorough heat exchange channel 105 is formed between the raised bars 104 on the outer wall of the battery support bracket and the battery positioning slots 101 on the inner wall of the battery support bracket. Two sides of the upper end on the outer wall of the battery support bracket 1 are provided with a support rib 107 having the same height with the raised bar 104 and dovetailed inner grooves 106 are formed between the support rib 107 and the raised bar 104 and the adjacent raised bars 104. The dovetailed inner grooves 106 are so configured that the upper battery cell 4 may be supported and raised, and it provides an operation for an external clamping tool to operate the battery group, for example, to clamp the battery group.

The baffle 2 is disposed below the open end of the bottom battery support bracket among the vertically stacked battery support brackets 1, the side wall of the baffle is provided with the horizontal protruding edge 202 corresponding to the horizontal protruding edge 102 on the open end of the battery support bracket 1. The horizontal protruding edges 102 and 202 are connected through the bolt to from the battery pack assembly.

A plurality of battery positioning slots 201 for accommodating the battery cell 4 therein are spacedly formed in the inner wall of the baffle 2 (a clapboard 3 may be set between the battery positioning slots 201 for spacing according to the need). A plurality of raised bars 204 are formed between two adjacent battery positioning slots 201 and on the outer wall of the baffle along the longitudinal axial direction of the battery positioning slots 201. A thorough heat exchange channel 205 is formed between the raised bars 204 on the outer wall of the baffle 2 and the battery positioning slots 201 on the inner wall of the baffle. The horizontal protruding edge 202 on two sides of the upper end on the outer wall of the baffle 2 is a downward horizontal protruding edge having the same height with the raised bar 204 so as to act as a support rib. Similarly, dovetailed inner grooves 206 are formed between the bottom of the horizontal protruding edge 202 and the raised bar 204 and between the adjacent raised bars 204. The dovetailed inner grooves 106 are so configured that the upper battery cell 4 may be supported and raised, and it provides an operation for an external clamping tool to operate the battery group, for example to clamp the battery group.

Figure 3:
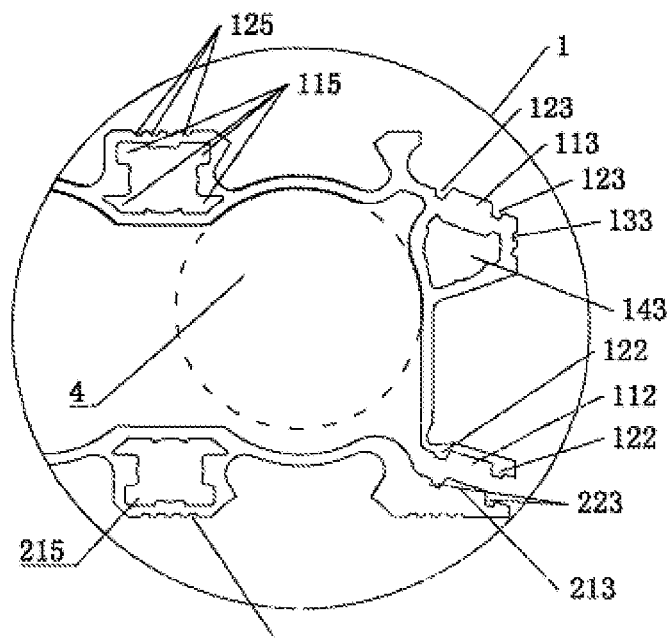
FIG. 3 is a partially enlarged diagram of the battery support bracket in FIG. 2.

Referring to FIG. 3, to enhance the water residence of the connected heat dissipation bracket for the battery pack assembly, the horizontal protruding edges 102 on the open end the battery support bracket 1 and the horizontal protruding edges 202 of the baffle 2 are provide with corresponding first ribs (or first grooves) 113 and 213. The two sides of the first rib (or first grooves) are provided with a corresponding groove shaped or rib shaped rigid sealing lines 123 and 223. The horizontal protruding bulge 103 is provided with a through hole 143 to decrease the weight or act as the heat exchange channel if it is necessary. The upper horizontal protruding edge on the horizontal protruding bulge 103 is provided with a second groove (or second rib) 112 corresponding to first ribs (or first grooves) 113 and 213. The two sides of the second groove 112 (or second rib) are provided with a corresponding groove shaped or rib shaped rigid sealing lines 123 and 223. The above mentioned structure may ensure a good tightness and provide an enough wall thickness for screwing the bolt so the connection strength may be ensured.

Figure 4:
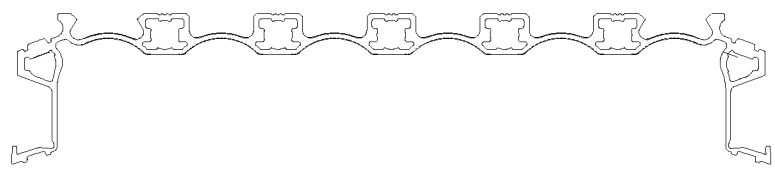
FIG. 4 is a schematic diagram of the battery support bracket according to another embodiment of the present invention.

Further, the battery support bracket 1, the raised bar 104 and 204 on the outer wall of the baffle 2 and the horizontal protruding bulge 103 on the side wall of the baffle 2 are provided with protruding ribs 125, 225 and 133. The protruding ribs 125, 225 and 133 may enhance the strength of the side, dissipate heat and anti-skid and is further convenient to fix and connect an external fixing member. The heat exchange channel 105 and 205 in the protruding ribs 104 and 204 and the inner wall of through hole 143 in the horizontal protruding bulge 103 are provided with a circle thread configured to connect with a guide pipe and inner through grooves 115 and 125 are disposed around the circle thread. So the material may be saved and the weight of the bracket may be decreased. The battery support bracket in FIG. 1 may be replaced with the battery support bracket in FIG. 4. The battery support bracket in FIG. 1 is similar with the battery support bracket in FIG. 4, the difference is that the two ends of the battery support bracket in FIG. 4 is provided with an upwardly protruding reinforcing rib to enhance the strength of the edge.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A heat dissipation bracket for a battery pack assembly, comprising:
a plurality of battery support brackets with an open end in a lower portion thereof; and
a baffle mated with the open end,
wherein the open end and an upper end of the battery support bracket and two sides of the baffle are provided with corresponding horizontal protruding edges; the open end of one of the plurality of battery support brackets is provided with the baffle, while the rest of the battery support brackets are vertically stacked and disposed on the upper end of the battery support brackets; the battery support bracket, the baffle, and the stacked battery support brackets are connected through bolts in the corresponding horizontal protruding edges; a plurality of battery positioning slots are formed by the battery support brackets and an inner wall of the baffle; a plurality of raised bars are formed on an outer wall of the baffle along the longitudinal axial direction of the plurality of battery positioning slots, and a heat exchange channel is formed between the plurality of raised bars on the outer wall and the plurality of battery positioning slots on the inner wall.

2. The heat dissipation bracket for a battery pack assembly of claim 1, wherein the heat exchange channel is provided with a thread configured to be connected with a guide pipe and a through groove is disposed on an inner wall of the heat exchange channel.

3. The heat dissipation bracket for a battery pack assembly of claim 1, wherein the horizontal protruding edges on the open end and the upper end of the battery support bracket are provided with a corresponding first rib or first groove and the horizontal protruding edges on the baffle are provided with a second groove or second rib corresponding to the horizontal protruding edges on the open end of the battery support bracket.

4. The heat dissipation bracket for a battery pack assembly of claim 1, wherein at least two of the plurality of battery positioning slots are formed in the battery support brackets and the inner wall of the baffle, each two adjacent ones of the battery positing slots are spaced from each other, the battery support bracket and the plurality of raised bars on the outer wall of the baffle are disposed between the plurality of battery positioning slots.

5. The heat dissipation bracket for a battery pack assembly of claim 4, wherein the heat exchange channel is provided with a thread configured to be connected with a guide pipe and a through groove is disposed on an inner wall of the heat exchange channel.

6. The heat dissipation bracket for a battery pack assembly of claim 4, wherein the horizontal protruding edges on the open end and the upper end of the battery support bracket are provided with a corresponding first rib or first groove and the horizontal protruding edges on the baffle are provided with a second groove or second rib corresponding to the horizontal protruding edges on the open end of the battery support bracket.

7. The heat dissipation bracket for a battery pack assembly of claim 4, wherein two sides of the upper end on the outer wall of the battery support bracket and the baffle are provided with a support rib having the same height with the plurality of raised bar and dovetailed inner grooves are formed between the support rib and the plurality of raised bar and between the plurality of raised bars.

8. The heat dissipation bracket for a battery pack assembly of claim 7, wherein the heat exchange channel is provided with a thread configured to be connected with a guide pipe and a through groove is disposed on an inner wall of the heat exchange channel.

9. The heat dissipation bracket for a battery pack assembly of claim 7, wherein the horizontal protruding edges on the open end and the upper end of the battery support bracket are provided with a corresponding first rib or first groove and the horizontal protruding edges on the baffle are provided with a second groove or second rib corresponding to the horizontal protruding edges on the open end of the battery support bracket.

10. The heat dissipation bracket for a battery pack assembly of claim 9, wherein two sides of the first rib or first groove, second rib or second groove on the horizontal protruding edges are provided with a corresponding groove shaped or rib shaped rigid sealing line.

11. The heat dissipation bracket for a battery pack assembly of claim 10, wherein the horizontal protruding edges on the upper end of the battery support bracket are disposed on a horizontal protruding bulge on the side wall.

12. The heat dissipation bracket for a battery pack assembly of claim 11, wherein the horizontal protruding bulge is provided with a through hole.

13. The heat dissipation bracket for a battery pack assembly of claim 4, wherein a clapboard is disposed between the plurality of battery positioning slots of the battery support bracket.

14. The heat dissipation bracket for a battery pack assembly of claim 4, wherein the battery support bracket and the plurality of raised bars on the outer wall of the baffle are provided with a protruding rib for dissipating heat and preventing skidding.

* * * * *